Sept. 19, 1967     C. B. KREKELER     3,342,530
CUTTING WHEELS FOR MINING MACHINES AND THE LIKE
WITH REPLACEABLE CUTTER BEARING RIMS
Filed Sept. 17, 1964     2 Sheets-Sheet 1

INVENTOR.
CLAUDE B. KREKELER,
BY Youngblut, Melville,
Strasser & Foster,
ATTORNEYS.

Sept. 19, 1967  C. B. KREKELER  3,342,530
CUTTING WHEELS FOR MINING MACHINES AND THE LIKE
WITH REPLACEABLE CUTTER BEARING RIMS
Filed Sept. 17, 1964  2 Sheets-Sheet 2

INVENTOR.
CLAUDE B. KREKELER,
BY Yungblut, Melville,
Strasser & Foster,

ATTORNEYS.

United States Patent Office 3,342,530
Patented Sept. 19, 1967

3,342,530
CUTTING WHEELS FOR MINING MACHINES AND THE LIKE WITH REPLACEABLE CUTTER BEARING RIMS
Claude B. Krekeler, Hamilton County, Ohio, assignor to The Cincinnati Mine Machinery Co., Cincinnati, Ohio, a corporation of Ohio
Filed Sept. 17, 1964, Ser. No. 397,098
8 Claims. (Cl. 299—89)

ABSTRACT OF THE DISCLOSURE

A cutting device for attachment to a driven shaft of a mining machine or the like, comprising a wheel-like structure affixable to the driven shaft and having a peripheral rim, and an additional replaceable rim surrounding the first mentioned rim and having cutter elements in association therewith. Resilient means interposed between the rims whereby the outer rim and cutter elements may be driven by the first mentioned rim.

---

The invention has to do with the problem of renewing the cutting wheels or heads of mining machines when they become too worn for further use.

There are various forms of mining machines which employ cutting wheels or cutting heads and which are adapted to mine coal or other mineral substance by cutting directly into the face of a seam. By the action of the cutting devices the coal or other mineral is reduced to a divided condition such that it may be delivered by the cutting devices to a conveyor forming part of the machine. This conveyor carries the cut coal through a space provided in the machine and delivers it to conventional mine cars on tracks, or to another conveyor by which the cut mineral may be removed from the mine entry in which the machine is working.

There are numerous mining machines employing cutting wheels or cutting heads, which are so well known in the art as to require no general illustration in this application.

Some of these machines are characterized by forwardly projecting arms having powered shafts at their outer ends upon which the cutting wheels are mounted. The shafts are driven by electric motors in the bodies of the machines. Also, powered means are provided for moving the arm or arms in up and down and lateral directions so that the cutting may proceed on the whole area of a seam as defined by the mine entry, and in particular over an area large enough to permit the entire mining machine to be moved forward as the cutting proceeds.

The cutting wheels have hub members which are integral with or attachable to the shafts aforesaid, web members which extend between the hubs and an outer rim, and an outer rim upon which various socket members or lugs are mounted for the reception of cutting tools. The socket or lug members which accept the shanks of the cutting tools are generally welded to the rims of the cutting wheels, and may be positioned to locate the various cutting tools so as to make a cut wider than the thickness of the wheel itself. The socket or lug members have perforations to accept the shanks of the cutting tools and some means, preferably easily releasable, for holding the shanks in the perforations during the cutting operation.

While the cutting tools are themselves renewable and are frequently changed, considerable wear occurs on the lug or socket members, and some wear may occur on the outer portions of the cutting wheel rims. Hitherto, when such wear has occured on the lugs or the rims or both, it has been necessary to demount the cutting wheels and replace them with new cutting wheels. In some instances this has required removal of the mining machine from the entry, interrupting the mining operation for a substantial period of time. At the least, worn wheels have had to be taken off and transported to a place where they can be refitted for service. If the lugs are worn, but not the rims, it will be necessary to cut the lugs away from the rim and weld other lugs in the required positions. If the rim is also worn, it may be necessary to cut the rim from the wheel and weld another rim in place, machining the rim as may be required. Such operations cannot be carried on in the mine entry, as will be evident.

It is a basic object of the invention to provide a structure by which it becomes possible to renew the worn portions of a cutting wheel or cutting head very rapidly while the mining machine remains in the entry in which it is working.

It is an object of the invention to provide a structure and method for the replacement of those parts of a cutting wheel or head which become worn, without replacing the entire wheel or head.

It is an object of the invention to provide a means interposed between the cutting tools and source of power which will have a slightly resilient action for the protection of the machinery.

These and other objects of the invention which will be set forth hereinafter or will be apparent to one skilled in the art are accomplished by that procedure and by the use of those structures of which certain exemplary embodiments will now be described. Reference is made to the accompanying drawings wherein.

The term "cutter wheel" as used herein signifies a rotating, wheel-like element having lugs or socket members upon its periphery and adapted to cut into the face of a seam of coal or other mineral when rotated and moved in a direction transverse the wheel axis. The term "cutting head" as used herein signifies a rotating element bearing lugs and cutter bits and adapted when rotated and moved axially to cut into the face of a seam of coal. The skilled worker in the art will understand that some types of mining machines may employ additional cutting elements. For example cutting chains are frequently combined with cutting heads.

Figure 1:
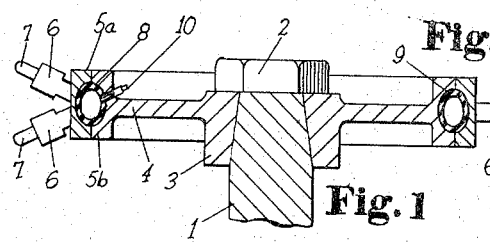
FIG. 1 is a sectional view through the assembled cutting wheel of this invention.
Figure 2:
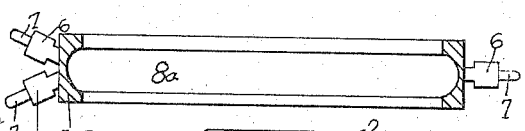
FIG. 2 is a sectional view of a detachable rim portion of the cutting wheel of FIG. 1.
Figure 3:
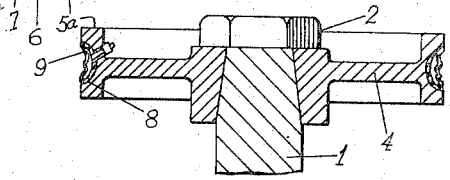
FIG. 3 is a sectional view of the remainder of the elements of the cutting wheel.

In FIGS. 1, 2 and 3 there is shown one type of cutting wheel constructed in accordance with this invention. Included are a shaft 1 which will be understood as driven by the mining machine motor, together with a means such as the nut 2 for holding the wheel to the shaft. The wheel proper has a hub element 3 adapted to be fixed non-rotatably to the shaft. This may be accomplished in various ways constituting no limitation on this invention. The shaft may have a conical end coacting with a conical bore in the hub, the interengagement being essentially frictional. But it will be more usual to spline the shaft to the hub or to provide the shaft end and the perforation in the hub with mating serrations.

The cutting wheel also has either a solid flange portion 4 or a series of spokes for connecting the hub with the wheel rim indicated at 5a and 5b. Certain lug members 6 generally in the form of forgings are welded to the outer rim 5a. These lug members have central perforations for the receipt of the shanks of cutting tools 7. The specific nature of the cutting tools and lug members does not form a limitation on the invention; but the skilled worker in the art will understand that the lugs or the perforations in the lugs are so arranged that the various cutting tools 7 will coact to form a kerf or cut wider than the wheel itself. For this reason FIG. 1 shows a structure having two lug members extending somewhat laterally at the top and a single lug member at the bottom; but it will be understood that the lugs will extend in a closely spaced series about the entire periphery of the rim 5a. Some mining machines will have a plurality of cutting wheels on the same shaft. This has not been illustrated because it is well known in the art.

In the practice of this invention the rim portion of the cutting wheel is indicated as made in two parts designated as 5a and 5b. The inner rim element is integral with or permanently attached to the flange 4. A hollow 8 is formed in the inner rim element. A corresponding hollow 8a is formed in the outer rim element. These come together when the rim is assembled to form a housing for a pressure member which can be inflated to affix the rim elements to each other. The last mentioned member, designated at 9, will be flexible so that when deflated it can be contained substantially entirely in the hollow 8 of the inner rim element so as to permit the removal of the outer rim element. Otherwise the flexible, inflatable means 9 will be of the general configuration of a vehicle tire or inner tube, and it will be provided with a valve 10 for inflation. The element 9 will be made of rubber, natural or synthetic, flexible plastic, or any of the chemical substitutes for rubber, such as isoprene. Since the function of the member 9 is not only to hold the rim elements 5a and 5b in assembly, but also to transmit the forces required for the cutting operation from the inner rim 5b to the outer rim 5a, it follows that the element 9 should be adequately strong for the purpose. Its walls may be of any thickness which will still permit the depression of the member 9 into the cavity 8 of the inner rim element. For added strength the element 9 may if desired be reinforced with chords or fabric as is usual in the manufacture of tires. However, since the areas of contact between the member 9 and the inner and outer rims are large, it is not difficult to provide a resilient structure which will adequately transmit the forces required in the mining of coal or other similar mineral.

Inflation of the member 9 may be by a gas such as air or by a liquid; and the valve 10 being similar to the valve on a vehicle tire will prevent deflation of the element 9.

The tools or cutter bits 7 (the configuration of which forms no necessary limitation on this invention) may be replaced as they become too dull for efficient cutting. It is preferable, but forms no limitation on the invention, to provide some readily releasable means whereby the shanks of the cutting tools may be held in the perforations of the lug members, with the tools or cutter bits readily removable and replaceable by a knock-in, pry-out action. In this connection reference is made to the patent in the name of the present inventor No. 2,965,365, issued Dec. 20, 1960. However, other means may be employed including set screws and the particular means by which the tool shanks are removably engaged in the lug members is not a limitation on the invention.

However, should the lug members themselves become worn, or corroded by acidic mine waters, or should the outer rim element 5a become worn or broken, it is only necessary in the practice of this invention to deflate the element 9 by manipulating the valve 10. Thereupon the outer rim element 5a may be bodily removed from the remaining wheel structure as illustrated in FIGS. 2 and 3. The removed outer rim may then be transported to a shop where it can be rebuilt, machined or dressed, and provided with new lugs to take the place of any which have become worn, corroded or broken. A new outer rim element such as that illustrated in FIG. 2 may then be placed in position, the member 9 reinflated by means of a pump or a tank or other source of compressed fluid, and the mining operation may be continued without any significant shut-down time.

Figure 4:
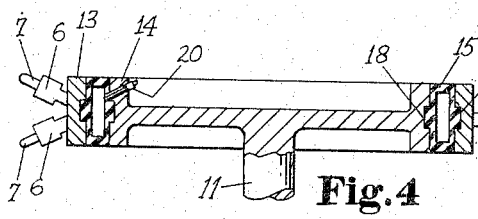
FIG. 4 is a sectional view of another form of assembled cutting wheel.
Figure 5:
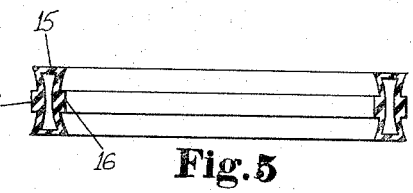
FIG. 5 is a sectional view of another form of element by means of which a rim section can be joined to the wheel.

A modified structure is shown in FIGS. 4 and 5. Here the shaft 11 is shown as integral with the wheel flange 12. This is, of course, optional.

The wheel structure again incorporates an outer rim 13 and an inner rim 14 spaced from each other. The inflatable element 15, while annular, has a generally rectangular cross sectional shape when inflated. It also has inside and outside annular ribs or protuberances 16 and 17, while the interior surface of the outer hub member and the exterior surface of the inner hub member are provided with annular grooves 18 and 19 to accept the annular ridges 16 and 17 of the inflatable structure.

When the structure 15 is deflated as illustrated in FIG. 5, its broader parallel walls tend to approach each other as shown, permitting the disengagement of the annular ribs on the inflatable member from the annular grooves in the inner and outer rim members. Thus the outer rim member can readily be removed from the cutting wheel and another outer rim member placed thereon without substantial interruption of the productivity of the mining machine. The inflated condition of the member 15 is shown in FIG. 4; and the member will be provided with a valve 20 for inflation and deflation as above described.

Figure 6:
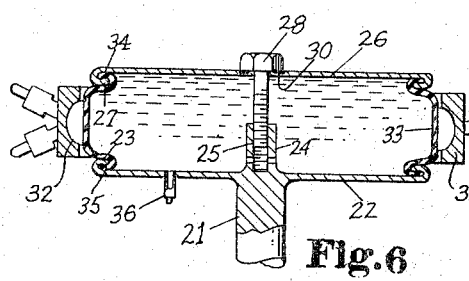
FIG. 6 shows in section a modified structure with the parts in such positions that a worn rim section may be removed.
Figure 7:
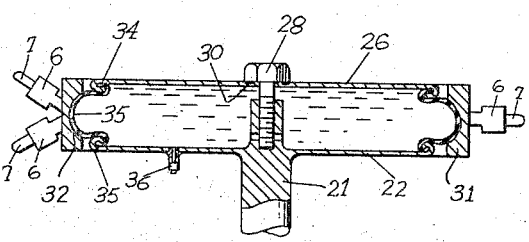
FIG. 7 is a sectional view of the fully assembled cutting wheel of FIG. 6 in cutting position.

FIGS. 6 and 7 illustrate yet another form of this invention. Here the shaft 21 carries a disc-like element 22 which, however, has an inturned flange 23. The shaft 21 is shown as extending beyond the disc-like member 22 as at 24, and is counterbored as at 25 and threaded.

Opposite the disc-like member 22 another disc-like member 26 with an inturned flange 27 is provided. A bolt 28 passes through a central hole in the disc-like member 26 and is threaded into the counterbore of the shaft extension 24. The head 29 of the bolt is provided with an O-ring 30 or other sealing means.

The rim element 31 has a central annular hollow 32. A flexible annular element 33 is used in the structure of FIGS. 6 and 7. This flexible member has outturned flange elements 34 and 35 adapted to be engaged between the disc-like elements 22 and 26 and their respective flanges 23 and 27.

Hydraulic fluid may be introduced through a valve 36 into the space between the disc-like elements 22 and 26 and the annular element 33. As shown in FIG. 7 the result of threading the bolt further into the counterbore of the threaded shaft extension 24 will be to diminish the space filled with the hydraulic fluid. This causes expansion of the central portion of the element 33 so that, as shown in FIG. 7, it ultimately tightly engages the hollow 32 in the outer rim element.

One advantage of this construction is that it obviates the use of a pump or pressure cylinder for inflating the resilient member 33. It also eliminates as such the provision of a wheel structure having a hub, a web or spokes, and an inner rim element as previously described. The interengagement of the flanges 23 and 27 of the disc-like elements and the flanges 34 and 35 of the element 33 will normally be sufficient to prevent leakage and loss of the hydraulic fluid, the parts coacting generally in the way a tubeless vehicle tire coacts with the rim; but it is not beyond the scope of this invention to crimp the flanges of the disc-like elements against the flanges of element 33 with or without the interposition of adhesive or sealing substances.

Figure 8:
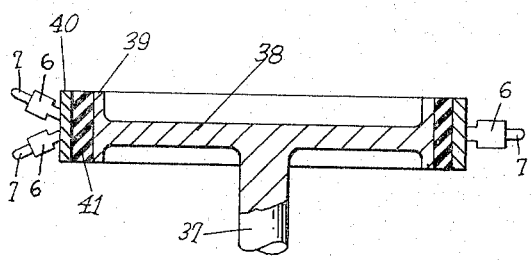
FIG. 8 is a sectional view of a cutting wheel employing a solid means for interconnecting the rim sections.

In FIG. 8 there is illustrated a cutting wheel structure having a shaft 37, an integral flange 38, an inner rim element 39 and an outer rim element 40. The rim elements are spaced from each other, and between them there is located an annular body of solid resilient substance 41. The structure of FIG. 8 is intended to illustrate a mode of interposing between the working cutter bit and the source of power a resilient means which will tend to cushion or absorb some of the extra strains of cutting, as where one or more cutter bits encounter a substance in the coal vein which is very much harder than the coal designed to be cut by the apparatus. To this end it is within the province of the invention to affix the resilient body 41 to either or both of the inner and outer rims by vulcanization or through the use of a suitable adhesive. There are various ways, however, of interengaging the resilient body and the rim elements so as to prevent displacement of the resilient body or displacement of the rim element with respect to each other. Some of these ways will be outlined hereinafter. Even in a vulcanized structure like that illustrated in FIG. 8 it is nevertheless possible to remove the outer rim from the inner rim by cutting through the body of resilient substance.

Figure 9:
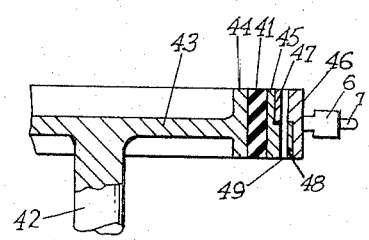
FIG. 9 is a partial sectional view showing a structural modification employing three rim elements.

In FIG. 9 there is shown a structure having a shaft 42, a flange 43 and an inner rim 44. A block of resilient substance 41 may be located between the inner rim 44 and an intermediate rim 45. This block may be physically engaged with the approaching surfaces of the inner and intermediate rim members in any way desired and may be vulcanized or adhesively secured to these members, since it is not designed for removal. The structure illustrated in FIG. 9 is, however, provided with an outer rim element 46 which is designed to be engaged with and removable from the intermediate rim member. This can be accomplished in various ways as by providing the outer rim member with an inwardly projecting annular flange 47 and by providing the intermediate rim member with an outwardly projecting mating flange 48. The two flanges interengages as indicated; and they may be fastened together in some removable fashion as by a pin 49, a bolt, machine screws or the like. In this structure when it becomes necessary to renew or replace any of the lug members 6 or to replace the outer rim itself, it is only necessary to remove the outer rim from the intermediate rim and install a new outer rim with its appurtenances.

Figure 10:
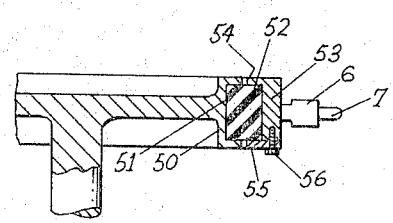
FIG. 10 is a partial sectional view of the rim portion of a cutter wheel employing a solid resilient ring.

FIG. 10 is an abbreviated sectional view showing a modified construction. The inner rim 50 has a central depression 51 to receive the resilient body 52. There is no intermediate rim; but the outer rim 53 which bears the lugs and cutting tools is provided with an integral inturned edge flange 54 on one side and with an annular element 55, taking the place of an opposite flange on the other side. The element 55 may be held in place by screws 56. The parts may be so configured that when the screws 56 are tightened up the resilient body 52 may be subjected to such constriction as will provide an adequate coefficient of friction between the inner and outer rim members and the annular resilient body 52.

Figure 12:
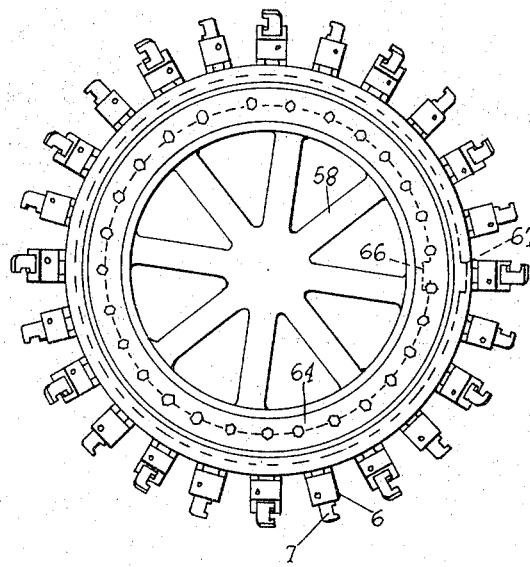
FIG. 12 is a partial elevational view of a cutting wheel illustrating a mode of engagement between a resilient ring and inner and outer rim members.
Figure 11:
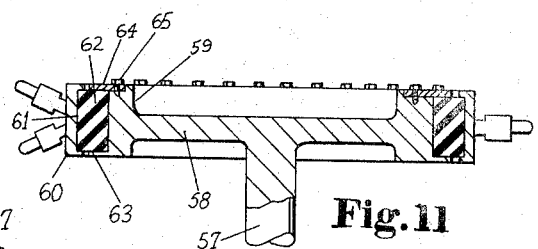
FIG. 11 is a sectional view of a cutter wheel also employing a solid resilient ring but modified as to the manner in which the ring is held in place.

FIG. 11 shows a structure having a shaft 57, a flange 58 and an inner rim 59. The outer rim 60 in this instance has a central annular recess or groove 61 to accept the outer portion of the annular resilient body 62. In this instance, however, the inner rim has an integral flange 63 upon one side and a removable flange member 64 upon the other side held in place by screws 65. This is essentially a reversal of the parts shown in FIG. 10; but the corresponding elevational view, FIG. 12, illustrates how the resilient body 62 may be provided on its inner and outer peripheries with projections or bosses 66 and 67 shaped and located to enter corresponding recesses in the inner and outer rim members. In this way the resilient body is as it were keyed to the inner and outer rim members so that while there is a resilient connection between the inner and outer rims, which is effective both in the radial and circumferential directions, there can be no great amount of rotation of the rim members with respect to each other.

Figure 13:
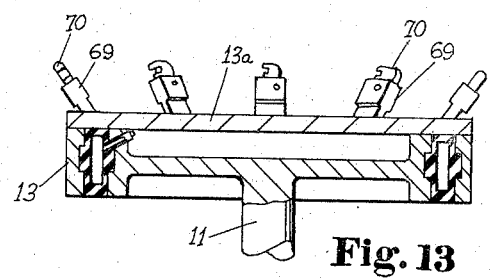
FIG. 13 is a partial sectional view showing the application of the principles of the invention to a cutter head.

The application of the principles of this invention to the provision of cutting heads as distinguished from cutting wheels is illustrated in FIG. 13. FIG. 13 as drawn shows a difference with respect to FIG. 4, for example, only in that the outer rim 13 has a plate element 13a attached to it on one edge. It is this plate element which carries the lugs and bits 69, 70 in a suitable arrangement for cutting where the shaft 11 extends substantially normal to the face of the coal seam and wherein it is rotated during the advancement of the shaft or the machine in the axial direction. While the member carrying the lugs and cutter bits has been indicated as a circular disc or plate, it will be understood by one familiar with mining machinery that it may have other shapes and may also be provided with arms carrying lugs and cutting tools. Nevertheless, the structure shown in FIG. 13 may be demounted and replaced in the ways indicated above for the outer rims of cutting tools.

Figure 14:
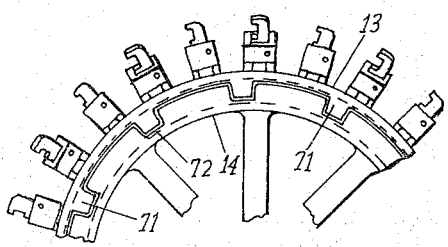
FIG. 14 is a partial elevational view showing a structure in which inner and outer rim members have both a resilient connection and a mechanical interlock.
Figure 15:
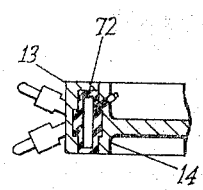
FIG. 15 is a cross sectional view of the structure shown in FIG. 14.

FIGS. 14 and 15 are related to FIG. 4 but show a modified structure with provision for limiting relative rotation of the inner and outer rims. In these figures, the outer rim 13 is provided with radially inwardly extending teeth 71 at suitable intervals. The teeth lie in notches or recesses 72 in the inner rim 14; and the teeth and notches are located beyond the side of the resilient means 15. A tight engagement of the teeth in the notches is not desired. Rather there is preferably some play, since a degree of resilience in the interconnection between the inner and outer rims is desirable. But the teeth 71 and notches 72 come into play whenever there is slippage between the resilient member 15 and either of the rim members. Since the tooth and notch construction is located upon one side only of the rim members, it will not interfere with the removal of the outer rim from the inner rim upon deflation of the resilient element. For example, upon such deflation the outer rim 13 may be removed from the inner rim upwardly in FIG. 15. The tooth and notch construction is of value in preventing undue distortion of the resilient element such as might weaken or rupture it. It will be noted that the tooth and notch construction not only limits rotative displacement of the rim members 13 and 14 but also will limit radial movement of the outer rim 13 toward the inner rim member at the point where cutting is being done.

Figure 16:
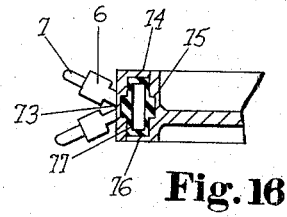
FIG. 16 is a partial sectional view showing another configuration of the inner and outer rim members and the interconnecting element.

FIG. 16 shows yet another modification, wherein the outer rim 73 has a flange 74 on one side and the inner rim 75 has an inner rim 76 upon the opposite side. In this structure, the resilient, inflatable element 77 is completely housed and therefore protected from direct abrasion in the cutting operation. Yet the structure is demountable for purposes of the invention.

Modifications may be made in the invention without departing from the spirit of it.

The embodiments of the invention in which an exclusive property or privilege is claimed are defined as follows:

1. In a cutting device for attachment to a driven shaft of a mining machine, a wheel-like element having a hub for engaging the shaft, a rim, and means interconnecting the rim and hub, an outer rim surrounding the first mentioned rim and resilient means interposed between the said rims for driving the outer rim from the first mentioned rim, cutter elements associated with and driven by said outer rim, said resilient means comprising a hollow annular member located between said rims and partially engaging in hollows in the approaching faces of the said rims, said approaching faces of said rims lying adjacent to one another, said resilient member being of rubber-like composition and provided with a valve whereby it may be inflated and deflated with fluid pressure, said resilient means being flexible and capable when deflated of lying substantially wholly within one of said hollows.

2. In a cutting device for attachment to a shaft of a mining machine, a wheel-like element having a hub for engaging the shaft, a rim, and means interconnecting the rim and hub, an outer rim surrounding the first mentioned rim and resilient means interposed between the said rims for driving the outer rim from the first mentioned rim, cutter elements associated with and driven by the said outer rim, said resilient means being a hollow annular member located between the said rims and partially engaging in hollows in the approaching faces of the said rims, said resilient member being of rubber-like composition and provided with a valve whereby it may be inflated and deflated with fluid pressure, and a plate element covering one side of said outer rim, the said cutting means being attached to the said plate.

3. In a cutting device for attachment to a driven shaft of a mining machine, a wheel-like element having a hub for engaging the shaft, a rim, and means interconnecting the rim and hub, an outer rim surrounding the first mentioned rim and resilient means interposed between the said rims for driving the outer rim from the first mentioned rim, cutter elements associated with and driven by the said outer rim, the said resilient means being an annular hollow means of substantially rectangular cross section and having inner and outer peripheral walls capable of approaching each other to free the outer rim from the first mentioned rim, and having a valve whereby the said resilient means is inflated with fluid pressure to make a tight connection between the said rims, said resilient means having protuberances on the said opposed annular walls, the said rims having recesses therein to accept said protuberances when said resilient member is in inflated condition, and a plate attached to one side of said outer rim, the said cutting means including lugs for the acceptance of cutting tools, said lugs being fastened to said plate.

4. In a cutting device for attachment to a driven shaft of a mining machine, a wheel-like element having a hub for engaging the shaft, a rim, and means interconnecting the rim and hub, an outer rim surrounding the first mentioned rim, resilient means interposed between the said rims for driving the outer rim from the first mentioned rim, cutter elements associated with and driven by the said outer rim, said resilient means being a hollow annular member located between the said rims and partially engaging in hollows in the approaching faces of the said rims, said resilient member being of rubber-like composition and provided with a valve whereby it may be inflated and deflated with fluid pressure cooperating teeth and grooves on said inner and said outer rims, said teeth lying within said grooves whereby to inhibit rotation of the said rims with respect to each other and whereby to limit resilient distortion of said resilient means.

5. In a mining machine the combination of a driven element and a rim, said rim having an inner surface and an outer surface, flexible means for connecting said driven element and said rim whereby said element is enabled to drive said rim, said flexible means being peripherally expandable so as to frictionally engage said inner surface of said rim, and mining machine cutting elements in connection with said outer surface of said rim and adapted to be driven thereby, said driven element comprising a shaft, a flange on said shaft, said shaft having a forward extension which is counterbored and threaded, there being a second flange element, a bolt passing through said flange element and threaded into said shaft extension, said flexible means comprising an annular resilient element connecting the peripheral portions of said flanges, the space between said flanges and said resilient element being filled with hydraulic fluid, and the arrangement being such that upon tightening said bolt said second flange element approaches said first mentioned flange and said resilient element is expanded outwardly peripherally so as to come into engagement with said inner surface of said rim.

6. The structure claimed in claim 5 wherein said rim is formed on its inner surface with an annular hollow for engaging the expanded portion of said resilient element to prevent dislodgement of the rim from said driven element.

7. In a mining machine, a rotatable ring-like element, said element having an internal annular recess whereby it may be connected by a resilient member to driving means, a plate connected to said ring-like element upon one side, said plate being continuous and having a peripheral diameter substantially equal to the diameter of said ring-like element, cutting means affixed to said plate for movement thereby in a cutting direction.

8. In a cutting device for attachment to a driven shaft of a mining machine, a wheel-like element having a hub for engaging the shaft, a rim, and means interconnecting said rim and said hub, an outer rim surrounding the first mentioned rim and resilient means interposed between said rims for driving said outer rim from said first mentioned rim, and cutter elements associated with and driven by the said outer rim, the said resilient means being an annular hollow means of substantially rectangular cross section and having inner and outer peripheral walls capable of approaching each other to free the outer rim from the first mentioned rim, and having a valve whereby the said resilient means is inflated with fluid pressure to make a tight connection between the said rims, said resilient means having protuberances on the said opposed annular walls, the said rim members having recesses therein to accept the said protuberances when said resilient member is in inflated condition, said outer rim having an annular flange on one side, said first mentioned rim having an annular flange on the opposite side, said resilient member being substantially completely housed within said rims and said flanges, whereby said resilient member is protected from direct abrasion during the cutting operation of said mining machine.

References Cited

UNITED STATES PATENTS

| | | | |
|---|---|---|---|
| 1,147,620 | 7/1915 | Dobbins | 64—11 |
| 1,199,127 | 9/1916 | Storrs | 299—90 X |
| 1,675,723 | 7/1928 | Morgan | 299—89 X |
| 2,141,645 | 12/1938 | Fawick | 64—11 |
| 2,232,637 | 2/1941 | Schmitter | 64—11 |
| 2,307,129 | 1/1943 | Hines et al. | 64—27 |
| 2,629,990 | 3/1953 | Tocci-Guilbert | 64—27 |
| 2,714,506 | 8/1955 | Hansen | 299—89 |
| 2,754,102 | 7/1956 | Kraft et al. | 299—89 |
| 2,758,826 | 8/1956 | Paget | 299—89 |
| 3,221,619 | 12/1965 | Erickson | 299—41 X |

ERNEST R. PURSER, *Primary Examiner*.